United States Patent Office 3,042,727
Patented July 3, 1962

3,042,727
PREPARATION OF FLUOROFORM
Franciszek Olstowski, Freeport, and John Donald Watson, Lake Jackson, Tex., assignors to The Dow Chemical Company, Midland, Mich., a corporation of Delaware
No Drawing. Filed June 4, 1959, Ser. No. 817,984
7 Claims. (Cl. 260—653)

The present invention relates to a novel method of preparing fluoroform. More particularly, the invention involves the vapor phase hydrogenation of trifluoromethylhalides.

An early method of preparing fluoroform involved the hydrogenolysis of perfluorocarbons. This process involved polycarbon starting compounds, and, by way of illustration, demonstrated that the single carbon-containing fluorocarbon would not accomplish the desired result, Simmons, U.S. Patent 2,494,064. Simmons, in U.S. Patent 2,519,983, later disclosed an electrochemical process involving electrolyzing a liquid HF solution containing a fluorinatable organic starting compound. However, this process was complicated by many by-products and involved corrosive and physiologically dangerous materials.

More recently, Benning et al., in U.S. Patent 2,615,926, disclosed a process involving a non-catalytic hydrogenolysis of chlorine-containing fluorocarbons which required, as essential, at least 2 chlorine atoms.

The present invention is based on the discovery that hydrogen will react readily with compounds having the formula $CF_3X$, wherein X represents the halogens Cl, Br and I, or mixtures thereof, at a temperature sufficient to liberate HX and produce fluoroform. Separation of fluoroform is then readily accomplished by conventional methods. While hydrogen gas is preferred, other materials which generate hydrogen under the conditions of reaction may be employed. Vapor phase trifluoromethylhalide is passed through the reaction tube together with hydrogen gas in a reactant mole ratio of 1:4 to 4:1. Materially smaller proportions of hydrogen result in a decrease in conversions and yields. A relatively high proportion gives the best conversions and yields, probably due to less degradation to HF.

Residence times, as used herein, are based on the time the reactant gases spend in that portion of the reaction tube that is within the range of 100° C. of the temperature indicated for the operation. In our process, the residence times will be within the range of from about 0.1 to 10 seconds. Preferably, we employ a residence time of 0.5 to 1 second to obtain the best conversions and yields.

The reaction tube will be heated to temperatures of from about 450° C. to about 900° C. At temperatures materially below 600° C., the conversion and yields are comparatively low. Temperatures materially above 900° C. generally cause excessive decomposition with the formation of carbon, hydrogen fluoride, hydrogen chloride and carbon tetrafluoride. Optimum conversion and yields are generally obtained at a temperature range of 450° C. to 900° C.

The process will usually and preferably be carried out at a substantially atmospheric pressure, that is, at a pressure of 1 atmosphere. However, higher or lower variations in pressure have little or no effect on the results.

The presence of a copper catalyst is sometimes desirable but is not essential to the reaction. At lower temperatures the presence of copper results in higher yields, while at higher temperatures, the presence of copper produces greater degradation to HF. Suitable copper catalysts include, for example, copper turnings, copper wire, copper shot, and the like. Separation of the desired fluoroform is readily accomplished by collecting and condensing the effluent gas and thereafter fractionally distilling the resulting condensate.

The following examples are given to more clearly illustrate our invention but are not to be construed as limiting the invention thereto:

EXAMPLE 1

The reactor tube consisted of a 35 millimeter Vycor tube packed with a 6-inch length of copper turnings and set in a 2 kilowatt Sentry tube furnace. Gaseous $CF_3Cl$ and $H_2$ were passed through the tube in a 1:1 mol ratio of $H_2$ and $CF_3Cl$ at a total gas flow rate of 1 cubic foot per hour. The hot zone length of the Vycor tube reactor was assumed to be approximately 6 inches long. Residence time of the reactants at the operating temperatures ranged from 1.5 to 3 seconds.

An infra-red analysis of the exit gases showed the following compositions (in percent) produced at reaction temperatures of 500° C. and 700° C.:

| Temp., ° C. | $CF_3Cl$ | $CF_3H$ |
|---|---|---|
| 500 | 63 | 14 |
| 700 | 48 | 35 |

The remainder of the gases consisted of unreacted $H_2$ and HCl. Some attack of the Vycor tube by HF was noted.

EXAMPLE 2

Using a 15 millimeter Vycor tube heated by a 2 kilowatt Sentry furnace without copper turnings, an approximately 1:1 mol ratio of $H_2$ and $CF_3Cl$ was fed through the reactor at a total gas rate of 1 cubic foot per hour.

The product gases showed the following compositions (in percent) produced at various reaction temperatures:

| Temp., ° C. | $CF_3Cl$ | $CF_3H$ |
|---|---|---|
| 500 | 58 | 0 |
| 700 | 53 | 27.0 |
| 900 | 50 | 6.8 |

The remainder of the gases were assumed to be hydrogen.

EXAMPLE 3

Using a ¾ inch inside diameter nickel tube heated by a 2 kilowatt Sentry furnace, an approximately 1:1 mol ratio of $CF_3Br$ was fed through the tube at a total gas rate of 0.1 cubic foot per hour. The residence time of the reactants at the operating temperatures was estimated to be in the order of 10 seconds. The exit gases were washed with sodium hydroxide solution.

An infra-red analysis of the exit gases showed the following compositions in percent produced at various reaction temperatures:

| Temp., °C. | $CF_3Br$ | $CF_3H$ |
|---|---|---|
| 400 | 68 | Trace |
| 450 | 67 | 2.3 |
| 500 | 67 | 11.6 |
| 550 | 48 | 52 |
| 600 | 32 | 46 |

The remainder of the gases consisted of unreacted hydrogen.

Further runs without the presence of a copper catalyst were conducted and the data thus obtained are summarized in Table I.

Table 1

| Ex. No. | Temp., °C. | Flow Rate, ft.³/hr. | | Residence Time, Sec. | CF₃Cl, Grams | CF₃Cl, percent | CF₃H, percent | HF, Grams | Reacted F to, percent | | Yield CF₃H |
|---|---|---|---|---|---|---|---|---|---|---|---|
| | | CF₃Cl | H₂ | | | | | | HF | CF₃H | |
| 1 | 750 | 0.67 | 0.33 | 0.8 | 23 | 69 | 15.5 | 1.4 | 41.5 | 58.5 | 58.5 |
| 2 | 750 | 0.5 | 0.5 | 0.8 | 17.2 | 52 | 16.5 | 0.57 | 28.8 | 71.5 | 71.5 |
| 3 | 750 | 0.33 | 0.67 | 0.8 | 11.5 | 39 | 11.0 | 0 | 0 | 100 | 100 |
| 4 | 825 | 0.33 | 0.67 | 0.75 | 15.7 | 49 | 32 | 1.09 | 27.0 | 73.0 | 73.0 |
| 5 | 825 | 0.67 | 0.33 | 0.75 | 31.7 | 87 | 14 | 1.03 | 31.0 | 69.0 | 69.0 |
| 6 | 825 | 0.5 | 0.5 | 0.75 | 23.7 | 67 | 33 | 1.52 | 28.0 | 72.0 | 72.0 |

Table I shows that at 750° C., a high $H_2$ to $CF_3Cl$ ratio tends to give the best yields of $CF_3H$. The conversion per pass is much better at 825° C. than at 750° C. but the yield is not so sensitive to $H_2$ to $CF_3Cl$ feed ratio at the higher temperature. The analysis of $CF_3Cl$ and $CF_3H$ was an infra-red acid free analysis, and the $CF_3H$ yield data was based on fluorine content.

In a manner similar to that of the foregoing examples, trifluoromethliodide may be substituted for the trifluoromethylchloride or trifluoromethylbromide specifically shown with substantially the same results.

Various modifications may be made in the present invention without departing from the spirit or scope thereof and it is to be understood that we limit ourselves only as defined in the appended claims.

We claim:

1. A process of preparing fluoroform which comprises contacting hydrogen and a compound having the formula $CF_3X$, wherein X represents a halogen selected from the group consisting of Br and I, at a temperature ranging from about 450° C. to about 900° C. for a residence time ranging from about 0.1 second to about 10 seconds, and separating fluoroform from the reaction product.

2. A process of preparing fluoroform which comprises contacting hydrogen and a compound having the formula $CF_3X$, wherein X represents a halogen selected from the group consisting of Cl, Br and I, at a temperature ranging from 450° C. to about 900° C. for a residence time ranging from about 0.1 second to about 10 seconds, in the presence of a copper catalyst, and separating fluoroform from the reaction product.

3. A process of preparing fluoroform which comprises contacting hydrogen and a mixture of the compounds having the formula $CF_3X$, wherein X represents a halogen selected from the group consisting of Cl, Br and I, at a temperature ranging from about 450° C. to about 900° C. for a residence time ranging from about 0.1 second to about 10 seconds and in the presence of a copper catalyst, and separating fluoroform from the reaction product.

4. A process of preparing fluoroform which comprises contacting hydrogen and trifluoromethylchloride at a temperature ranging from about 600°C. to about 900° C. for a residence time ranging from about 0.1 second to about 10 seconds, and separating fluoroform from the reaction product.

5. A process of preparing fluoroform which comprises contacting hydrogen and trifluoromethylchloride at a temperature ranging from about 600° C. to about 900° C. for a residence time ranging from about 0.1 second to about 10 seconds and in the presence of a copper catalyst, and separating fluoroform from the reaction product.

6. A process of preparing fluoroform which comprises contacting hydrogen and trifluoromethyl bromide at a temperature ranging from 450° C. to about 900° C. for a residence time ranging from about 0.1 second to about 10 seconds, and separating fluoroform from the reaction product.

7. A process of preparing fluoroform which comprises contacting hydrogen and trifluoromethyl bromide at a temperature ranging from 450° C. to about 700° C. for a residence time ranging from about 0.1 second to about 10 seconds, and separating fluoroform from the reaction product.

References Cited in the file of this patent

UNITED STATES PATENTS 2,615,925    Bordner _____ Oct. 28, 1952

OTHER REFERENCES

Haszeldine: Journal of the Chemical Society (London) (1952), page 2510 relied on.